US006927791B2

(12) United States Patent
Kole

(10) Patent No.: US 6,927,791 B2
(45) Date of Patent: Aug. 9, 2005

(54) COLOR PICTURE CAMERA INCLUDING AN AMPLIFIER CIRCUIT FOR WHITENESS AND BRIGHTNESS COMPENSATION

(75) Inventor: Marcus Egbert Kole, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 579 days.

(21) Appl. No.: 09/928,204

(22) Filed: Aug. 10, 2001

(65) Prior Publication Data

US 2002/0048458 A1 Apr. 25, 2002

(30) Foreign Application Priority Data

Aug. 11, 2000 (EP) .............................. 00202831

(51) Int. Cl.[7] .................................. H04N 9/73
(52) U.S. Cl. .................................... 348/223.1; 348/655
(58) Field of Search ....................... 348/223.1, 225.1, 348/655, 222.1, 224.1, 266, 300, 280

(56) References Cited

U.S. PATENT DOCUMENTS 5,691,772 A * 11/1997 Suzuki .................... 348/223.1
5,751,348 A    5/1998 Inuiya et al. .............. 348/220
5,838,194 A * 11/1998 Khoury ...................... 330/139
6,342,919 B2 * 1/2002 Opris ....................... 348/241

OTHER PUBLICATIONS

JP 2000 224596 A; (NEC Corp) ,Aug. 11, 2000, Aug. 11, 2000, Figures 3, 6.

* cited by examiner

Primary Examiner—Wendy R. Garber
Assistant Examiner—Justin Misleh

(57) ABSTRACT

The invention relates to a color picture camera (1, 31, 41) with a sensor (2) having a surface to image color pictures, which pictures can be converted into electrical signals, a red component of the color picture generating an electrical red value signal (R), a green component of the color picture generating an electrical green value signal (G), and a blue component of the color picture generating an electrical blue value signal (B), which signals are supplied to a parallel/serial converter and an amplifier circuit (42) for a white compensation and a brightness compensation. According to the invention, the amplifier circuit includes a two-stage amplifier (43, 44) with a first amplifier stage (43) for a fine compensation and a second amplifier stage (44) for a coarse compensation.

4 Claims, 3 Drawing Sheets

Figure 1:
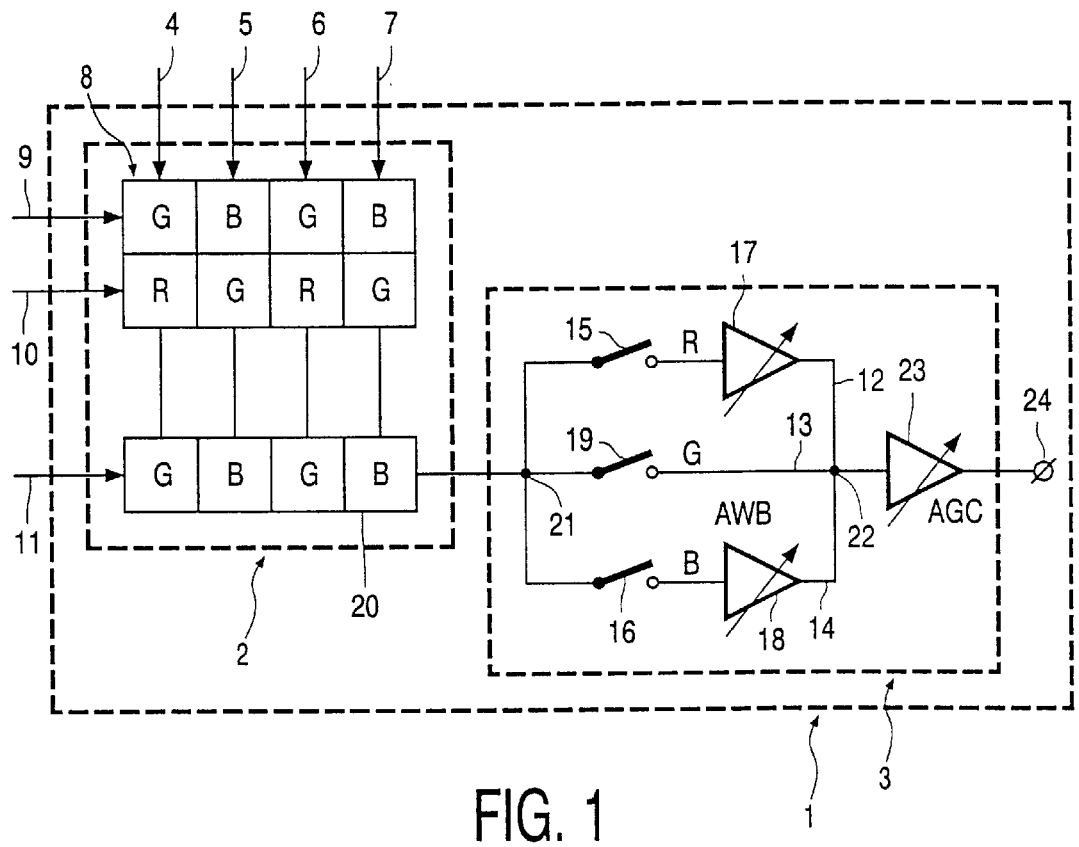

COLOR PICTURE CAMERA INCLUDING AN AMPLIFIER CIRCUIT FOR WHITENESS AND BRIGHTNESS COMPENSATION

The invention relates to a color picture camera with a sensor system on whose sensor surface color pictures can be imaged, which pictures can be converted into electrical signals, a red component of the color picture generating an electrical red value signal, a green component of the color picture generating an electrical green value signal, and a blue component of the color picture generating an electrical blue value signal, which signals are supplied to a parallel/serial converter and an amplifier circuit for a white compensation and a brightness compensation.

The brightness circuit is necessary for adapting the brightness of a picture. A picture with a low white component leads to a comparatively dark picture, which is made brighter, so that the full dynamic range of the sensor output is utilized. A picture with a high white content leads to a bright picture, which is made darker, such that the dynamic range is kept within the boundary conditions. The automatic white compensation is required for adjusting the picture temperature. This implies constant ratios between the red, green, and blue values in a picture. Both functions are arranged in one automatic amplifier control circuit, so that the two functions interfere with one another in the one circuit.

When a color picture is imaged on the sensor surface, this means that the automatic amplification control must switch over very quickly from high to low amplification as pixels of different colors are scanned and offered for processing in the circuit. These fast switches in the gain factor are hard and are usually not compatible with accuracy, small bandwidth, and low distortion.

The invention accordingly has for its object to provide a simple circuit which processes the alternating color value signals without defects.

This object is achieved by means of several different solutions. In the first solution according to the invention, the amplifier circuit comprises a first amplifier in a separate channel for a white compensation of the red value signal, a second amplifier in a second channel for a white compensation of the blue value signal, and a third, separate channel for the green value signal. The alternating color picture signals are each supplied to an amplifier for the automatic white compensation in separate channels in dependence on the color value. The color picture signals are strongly different as regards their gain factors. Each color picture signal is amplified in an amplifier specially designed only for this color picture signal. Accordingly, the gain factor for consecutive signals of this one color value are of the same order of magnitude, and a major fluctuation in the gain factor will not take place. The color value signals are amplified free from distortion. The green value signal corresponds approximately to the luminance signal. The red value and the blue value signal are adapted thereto and amplified such that the green value signal is given the factor 1. The green value signal accordingly remains unchanged in its separate channel.

Advantageously, the amplifier circuit comprises an amplifier for the brightness compensation of all color picture signals. All color picture signals are accordingly supplied to one amplifier for the brightness compensation. The gain factor for the brightness compensation does not change very strongly for consecutive signals, so that a single circuit suffices, which operates free from distortion. The green value signal is directly supplied to the amplifier for the brightness compensation.

The object is achieved by means of a second solution. In the second solution, the amplifier circuit comprises a first amplifier for the white compensation and the brightness compensation for the red value signal and the blue value signal, and a second amplifier for the brightness compensation of the green value signal. Every second transmitted signal is a green value signal, and between every two green value signals G either the blue value signal or the red value signal is transmitted, such that the number of the red value and the blue value signals is the same. The two amplifiers operate in alternation. The first amplifier amplifies either the blue value signal or the red value signal, the second amplifier only the green value signal. Because of the alternating operation, enough time remains for the first amplifier to achieve switch-overs in the gain factor. The amplifier for the white compensation is integrated with the amplifier for the brightness compensation for the blue value signal and the red value signal here. This gives a saving of one amplifier.

The object is achieved by means of a third solution. According to the invention, the amplifier circuit comprises a two-stage amplifier with a first amplifier stage for a fine compensation and a second amplifier stage for a coarse compensation. Independently of the fact that separate channels can be made available for the individual colors, either through separate controllable operational amplifiers for the automatic gain control and for the automatic white compensation or through integration thereof, use can be made of the fact that the control range for the automatic white compensation is much coarser than that for an automatic brightness control. Moreover, the pixel signal is inevitably serial, so that the use of a series-connected, two-stage, controllable operational amplifier with a fine automatic brightness control which is laid down for all colors and which switches only with the automatic gain control, and with a coarse automatic gain control based on an architecture with switches, renders it possible to change the gain factor very quickly.

Advantageously, the first amplifier stage comprises a transconductance amplifier for the fine tuning. Simple switching operations are made possible thereby.

Advantageously, the second amplifier stage comprises an operational amplifier connected with capacitors for the coarse tuning. The gain factor is given by a ratio of input capacitors to parallel capacitors which shunt the inputs with the outputs of the amplifier.

Figure 2:
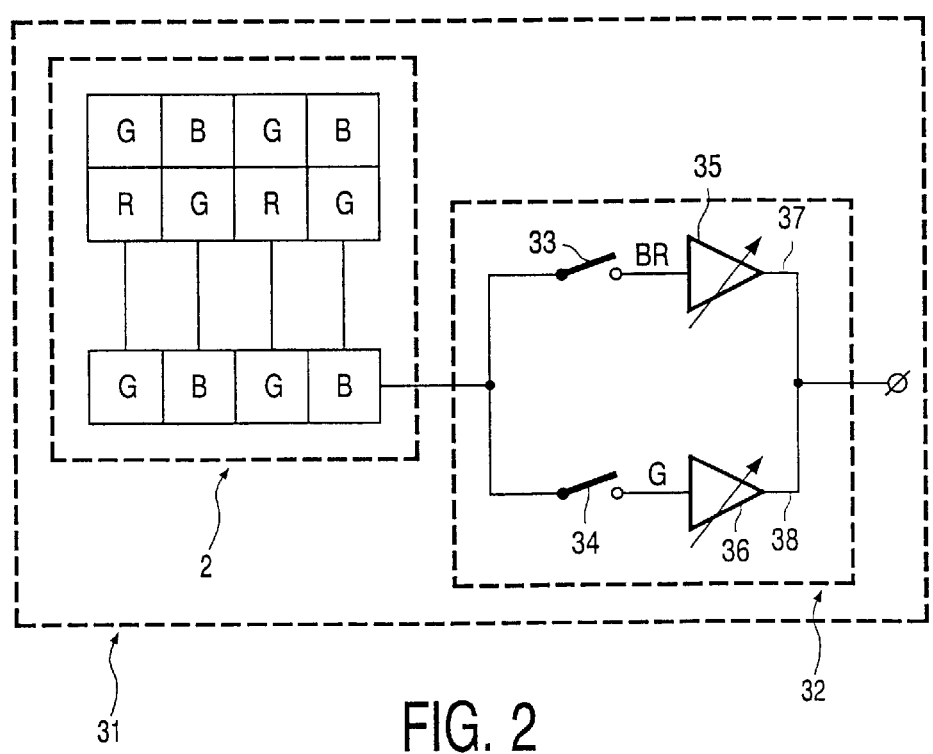
Figure 3:
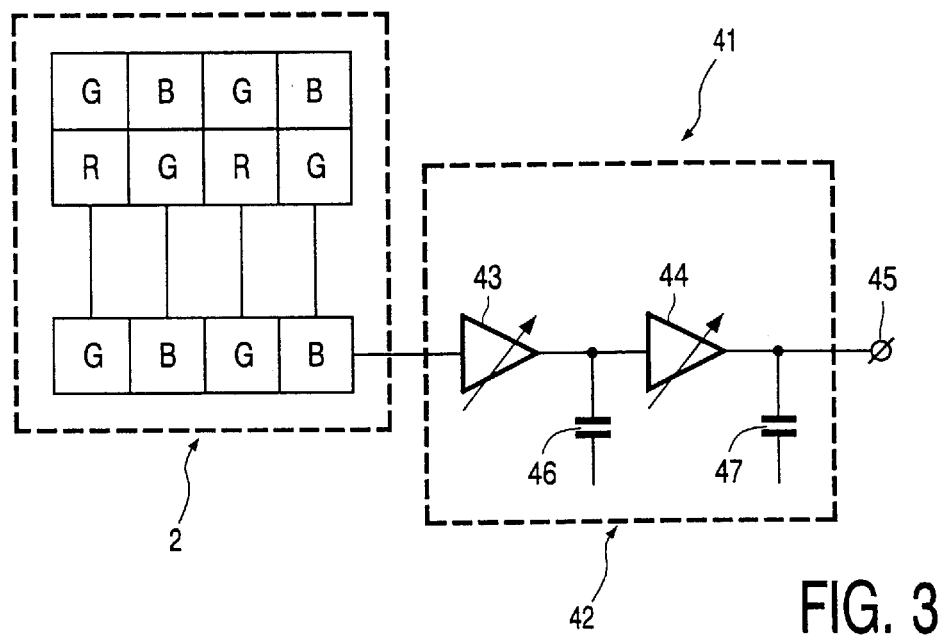
Figure 4:
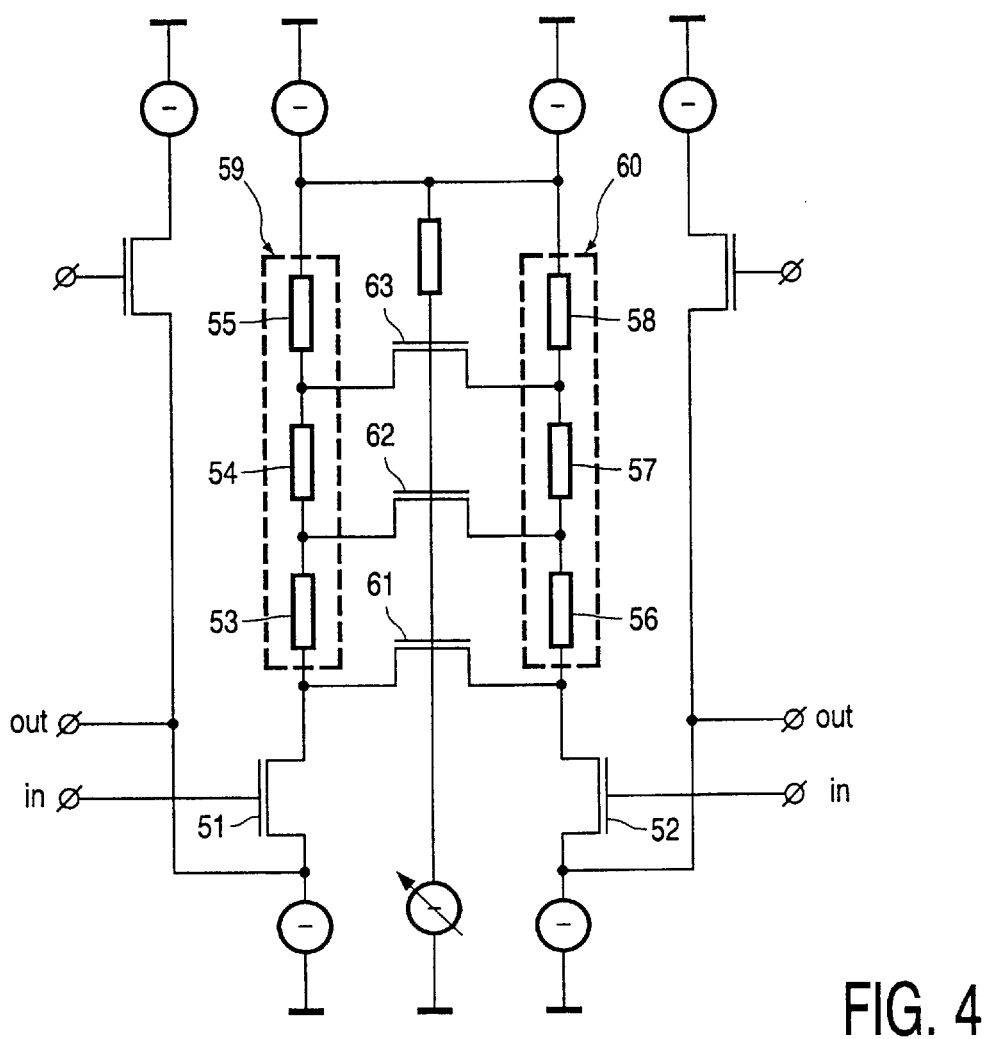
Figure 5:
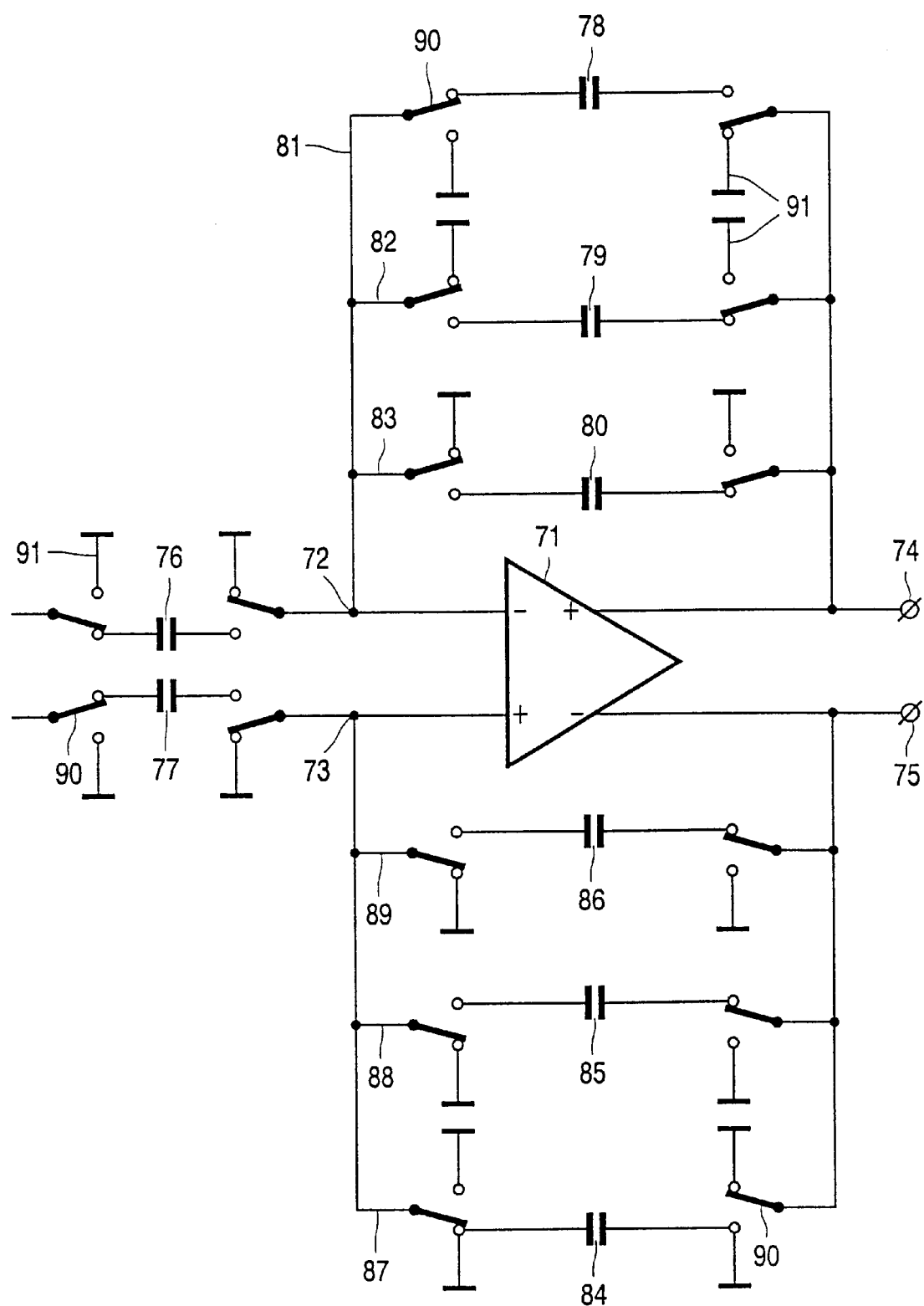

For a better understanding of the invention, embodiments are explained in more detail with reference to the drawing, in which FIG. 1 shows a first amplifier circuit with separate channels, FIG. 2 shows a second amplifier circuit with separate channels, FIG. 3 shows a two-stage amplifier circuit, FIG. 4 shows a transconductance amplifier as the first amplifier stage, and FIG. 5 shows an amplifier connected with capacitors as the second amplifier stage.

FIG. 1 shows a color picture camera 1 with a sensor 2 and an amplifier circuit 3. A color pattern is pictured on the sensor 2, which generates red color value signals R, green color value signals G, and blue color value signals B. These color value signals R, G, and B are put into temporary storage in four shift registers 4, 5, 6, 7 and can be represented in their simplest form as a matrix 8 with two lines 9 and 10. The color value signals R, G, and B are read in parallel into a parallel/serial converter 11 which supplies these values R, G, and B serially to the amplifier 3. The amplifier circuit 3 comprises three separate channels 12, 13 and 14. In the outermost channels 12 and 14, respective color selection switches 15 and 16 and controllable operational amplifiers 17 and 18 are arranged, and a color selection switch 19 is present in the central channel 13. The color value signal B is available for processing in an outermost cell 20 of the shift register 11. The color value signal is supplied to the operational amplifier 18 via a junction point 21 and the closed switch 16, which amplifier 18 multiplies the color value signal B by a factor so as to achieve a controlled or automatic white compensation (or automatic white balance, AWB). Then the modified color value signal B' is supplied through a further junction point 22 to a third controllable operational amplifier 23 which adapts the signal B' as to its brightness or carries out an automatic brightness compensation (automatic gain control, AGC). The signal B" thus adapted is supplied to an output 24. The color value signal G is transmitted through the central channel 13 through closing of the switch 19 and opening of the switches 15 and 16. The remaining signals R and B are multiplied by a factor such that the signal G, which corresponds most closely to the luminance signal, is given the factor 1 in the white compensation and thus remains unchanged in the central channel 13. The signal G is brightness-adapted in the operational amplifier 23 and supplied to the output 24 as a signal G". When the color value signal R is offered for processing, it will be transmitted into the upper channel 12 via the operational amplifier 17, with the switches 16 and 19 opened and the switch 15 closed. The red value signal R is multiplied by a factor in the operational amplifier 17 and the signal R' thus multiplied is guided via the junction point 22 to the operational amplifier 23, which adapts the brightness of the signal R'. The operational amplifier supplies the signal R" to the output 24.

FIG. 2 shows a color picture camera 31 with the sensor 2 and an amplifier circuit 32. The amplifier circuit 32 comprises two switches 33 and 34 and two controllable operational amplifiers 35 and 36. The switch 33 and the operational amplifier 35 are arranged in an upper channel 37, the switch 34 and the operational amplifier 36 in a lower channel 38. The color value signal B is supplied to the operational amplifier 35 with the switch 34 opened and the switch 33 closed. The operational amplifier 35 processes the blue value signal B both with the factor for the white compensation and with the factor for the brightness adaptation. The blue value signal thus adapted is supplied as a signal B" to the output 24. The green value signal G is passed through the operational amplifier 36, with the switch 33 opened and the switch 34 closed, and is multiplied by the brightness factor only. The operational amplifier 36 is analogous to the operational amplifier 23. The adapted green value signal is then available at the output 24 as a signal G". The red value signal is also passed through the operational amplifier 35 of the upper channel 37. The operational amplifier 35 multiplies also this signal by the factor for the white compensation and the factor for the brightness adaptation. Every second transmitted signal is a green value signal, and between every two green value signals G it is either the blue value signal or the red value signal which is transmitted, such that the numbers of red value and blue value signals are the same. The two amplifiers 35 and 36 operate in alternation. The amplifier 36 amplifies the green value signal, the upper amplifier 35 either the blue value signal B or the red value signal R.

FIG. 3 shows a color picture camera 41 with the sensor 2 and a third amplifier circuit 42. The amplifier circuit 42 is constructed in two stages and comprises two controllable operational amplifiers 43 and 44 connected in series. In a first amplifier stage 43 with the first operational amplifier 43, a fine tuning of the brightness factor is carried out, while the second amplifier stage 44 with the second operational amplifier 44 carries out the white compensation and the coarse tuning of the brightness compensation. All three color value signals are passed through these two operational amplifiers 43 and 44 and are then available at the output 45. A respective capacitor 46, 47 is connected behind each operational amplifier. An amplifier connected with capacitors or a switched current amplifier, in particular an amplifier with discrete amplifier stages, may be provided for the coarse tuning in the automatic gain control.

FIG. 4 shows an implementation of the operational amplifier 43. A continuously adjustable operational amplifier with low gain, great bandwidth, and minimum distortion factor suffices for the fine tuning in the automatic gain control. Such an operational amplifier may be formed by a transconductance amplifier which operates with two input transistors 51 and 52 as a differential pair. The transconductance of the differential pair 51 and 52 can be controlled via a connection of resistors 53–58 which form two resistor branches 59 and 60. Three control transistors 61–63 control the individual resistors 53–58 and connect and disconnect them in stages. The function of such a circuit is explained in more detail, for example, in WO 97/42704.

FIG. 5 shows an implementation of the operational amplifier 44. The amplifier comprises a differential amplifier 71 with two inputs 72 and 73 and two outputs 74 and 75. A signal applied to the input 72 will reach the differential amplifier 71 via a capacitor 76, and a signal applied to the second input 73 will reach the input via a second capacitor 77. The capacitors 76 and 77 have a capacitance value 1. The input 72 and the corresponding output 74 are shunted by three capacitors 78–80 connected in parallel in loops 81–83. The second input 73 and the corresponding output 75 are also shunted by three capacitors 84–86 connected in parallel in loops 87–89. Switches 90 are connected to the inputs 72 and 73 so as to lie in the loops 81–83 and 87–89, upstream and downstream of the capacitors 76–80 and 84–86, so that the capacitors 76–80 and 84–86 can be connected to ground 91 and be discharged. The innermost capacitors 79, 80, 85, and 86 of the loops 82, 83, 88, and 89 have a capacitance value 1, and the outermost capacitors 78 and 84 of the two loops 81 and 87 have a capacitance value 2. The capacitors 76–80 and 84–86 can be switched in this architecture such that a coarse amplification can be achieved. The gain value is given by the ratio of the input capacitors 76 and 77 to the parallel capacitors 78–80 and 84–86.

What is claimed is:

1. A color picture camera (1, 31, 41) with a sensor (2) including a sensor surface for imaging color pictures, which pictures being converted into electrical signals, a red component of the color picture generating an electrical red value signal (R), a green component of the color picture generating an electrical green value signal (G), and a blue component of the color picture generating an electrical blue value signal (B), which signals are supplied to a parallel/serial converter (11) and an amplifier circuit (3, 32, 42) for a white compensation and a brightness compensation, wherein the amplifier circuit (32) comprises an amplifier (35) for the white compensation and the brightness compensation of the red value signal (R) and the blue value signal (B), and an amplifier (36) for the brightness compensation of the green value signal (G).

2. A color picture camera (1, 31, 41) with a sensor (2) including a sensor surface for imaging color pictures, which pictures being converted into electrical signals, a red component of the color picture generating an electrical red value signal (R), a green component of the color picture generating an electrical green value signal (G), and a blue component of the color picture generating an electrical blue value signal (B), which signals are supplied to a parallel/serial converter (11) and an amplifier circuit (3, 32, 42) for a white compensation and a brightness compensation, wherein the amplifier circuit (42) comprises a two-stage amplifier (43, 44) with a first amplifier stage (43) for a fine compensation and a second amplifier stage (44) for a coarse compensation.

3. A color picture camera as claimed in claim 2, wherein the first amplifier stage (43) comprises a transconductance amplifier for the fine tuning.

4. A color picture camera as claimed in claim 2 or 3, wherein the second amplifier stage (44) comprises an operational amplifier in connection with capacitors (76–80 and 84–86).

* * * * *